UNITED STATES PATENT OFFICE.

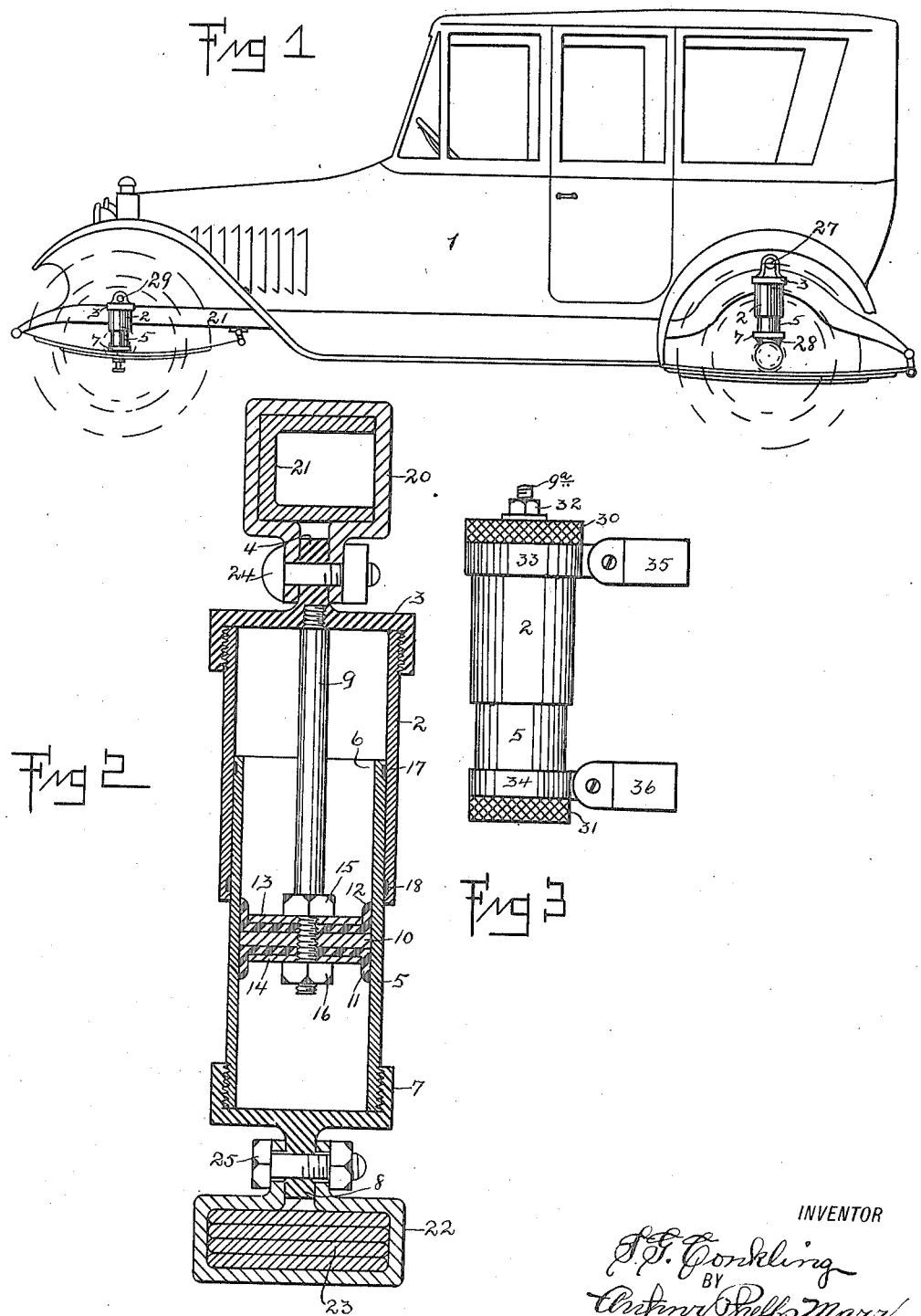

SAMUEL GOFF CONKLING, OF BROOKLYN, NEW YORK.

SHOCK-ABSORBER.

1,255,513.           Specification of Letters Patent.      Patented Feb. 5, 1918.

Application filed November 8, 1916. Serial No. 130,113.

*To all whom it may concern:*

Be it known that I, SAMUEL GOFF CONKLING, a citizen of the United States, and resident of the borough of Brooklyn, county of Kings, city and State of New York, have invented certain new and useful Improvements in Shock-Absorbers, of which the following is a specification.

The device the subject of this invention may be truly named a shock absorber, and this term should distinguish it from the spring operated or controlled device. It limits the rebound of a vehicle when the vehicle is passing over a rough road, in a manner however quite unlike the so-called "snubbers" which mechanically limit the upward movement of the body of the vehicle.

The particular objects of this invention are to provide a device that will operate in both the upward and downward direction, and will not only serve as a stopper preventing the sudden jump of the vehicle body but will also serve as a check preventing the sudden dropping of the body of the vehicle.

A further object is to provide a device that will operate on a strictly pneumatic principle as it has been discovered that the resiliency of air cannot be equaled as a medium for absorption of vibration.

A further object of the invention is to provide a device having no springs in its construction and one having so few mechanical parts that it may operate indefinitely with but the slightest attention.

The construction and operation and the advantages gained from the use of my device will be fully set forth as the specification progresses.

The following is what I consider a good means of carrying out my invention and the accompanying drawings should be considered together with the specification which follows for a complete understanding of my invention.

In the drawings

Figure 1 shows in diagram an automobile with my device in operative position.

Fig. 2 is an enlarged sectional view of my device and certain parts adjacent thereto.

Fig. 3 shows in side elevation a completed device and another means for securing it in position.

In Fig. 1 and at 1 I have shown an automobile and although I have indicated a large car of heavy construction I desire it understood that my device may be used with automobiles of any size, shape or description.

I have shown an automobile only so that the position of my shock absorber may be more readily understood and no attempt has been made to set forth with mechanical accuracy the several parts of the car.

My device consists of a cylindrical member 2, the inner end of which is open and the outer end of which is closed by means of a screw threaded cap 3, and formed integral with the cap 3 is a lug 4, by means of which my device may be secured in position.

Entering the open end of the cylinder 2, is a smaller cylinder 5, the inner end of which is also open and the lower or outer end of the cylinder 5 is also closed by means of a screw threaded cap 7 having a lug 8.

Centrally secured in the cap 3 and extending quite through the cylindrical member 2 is a piston rod 9, and arranged upon this rod is a double acting piston member, consisting of an intermediate plate 10, cup washers 11 and 12 supported thereon, and holding plates 13 and 14 secured by nuts 15 and 16 and serving to position the cups 11 and 12 and to cause them to bear upon the inner surface of the cylindrical member 5.

The cups 11 and 12 may be formed of any suitable material but I have used leather cups for the reason that in general practice leather cups have been found most satisfactory.

It will be noted that the piston although supported in the member 2 operates in the cylinder 5. I obtain however, a secondary piston or compressed action due to the movement of the member 5, in the cylinder 2, and to emphasize this secondary piston action and to make it more reliable I provide piston rings 17 and 18, one at the outer end of each of the cylindrical members 2 and 5. These rings assure that the air within the cylinders will not escape.

In the general application of my device I will provide a clamp 20 which may be termed a box clamp and which will be engaged around the side rim 21 of an automobile. The second box clamp 22 will be engaged upon the springs 23 and these box clamps will, by means of bolts 24 and 25, be secured to the lugs 4 and 8, therefore the position of my device will, under ordinary conditions, be in the ellipse of the spring, between the upper and lower portions of the spring or if a single spring is used, between the frame and the spring.

In some instances and with some certain designs of automobiles it will not be possible to insert a shock absorber between the spring and the frame or between the two portions of the spring, in this instance I will arrange my device as shown in Fig. 1, that is, slightly exterior to the frame and springs providing suitable brackets 27, 28 and 29 for securing my device in position.

The means employed for securing my shock absorber may be varied to meet differing conditions. I desire, however, that it should be arranged to operate in the general position shown, that is, upon a line transverse to the center of the axis of each wheel.

In the operation of my device the parts are assembled and secured as shown and described and it will be noted that the piston is elevated from the the bottom of the cylinder 5, when, because of a roughness of the road the running gear of the vehicle is suddenly elevated the piston will compress the air in the smaller cylinder 5 and the larger cylinder 2 will cause a compression upon the piston, both compressions operating to prevent a sudden shock being transmitted to the body of the vehicle.

When the roughness has passed and the running gear sinks to a normal running position the body will not immediately follow but will be checked in its descent by the suction of the piston within the cylinder 5 and by the suction caused by the cylinder 2.

Should the body be suddenly elevated or should the wheels drop into a rut or hole the air upon the piston will be constrained and the vehicle will not bound upward as it does under ordinary conditions. It will be seen therefore that my device checks a relative movement of the body or running gear in either direction, not only prevents sudden movement of one or the other part but also prevents vibration of the body due to the passage of the traction mechanism over rough roads.

In Fig. 3 I show cylinders 2 and 5 to which are secured knurled caps 30 and 31. In this construction the end of the piston rod 9ª, extends through the cap 30 and is secured by a nut 32 and a suitable washer.

The supporting means for this device consists of bands 33 and 34, around the cylinders 2 and 5, and terminating in projections which are engaged by suitable clamps 35 and 36. The operation of this device is similar to that as set forth in connection with Fig. 2.

Further advantages will be discovered in the operation of my device and I desire it understood that further modifications may be made within the scope of the appended claims without departing from the principle or sacrificing the advantages of this invention.

I see no reason why a slow moving liquid such as oil could not be used in my device; this might be an advantage where the device is used on trucks or other heavy vehicles.

Having carefully and fully described my invention what I claim and desire to secure by Letters Patent is:

1. A shock absorber having a cylinder in two parts operable one within the other and having their non-adjacent ends closed, a piston operable in one part of said cylinder and having a piston rod connected to and operable with the other part of said cylinder, and piston rings upon the peripheries of said cylinders and coöperating with the closed ends of said cylinder to prevent the escape of air therefrom.

2. A shock absorber comprising a plurality of cylinders, the outer ends of which are entirely closed and the adjacent ends of which are open, one of said cylinders operating within the other said cylinder and a piston within the inner cylinder and secured to the outer cylinder, the outward movement of said cylinders causing a suction and the inward movement a compression upon both sides of said piston.

3. A shock absorber having a plurality of cylinders one movable in the other, the adjacent ends of each cylinder being open and the opposite ends of each cylinder being closed, said cylinders forming an air tight chamber between them and a piston having its rod secured to the outer cylinder and movable in the smaller cylinder and operating therein to compress the air between said piston and the closed end of one said cylinder.

4. A shock absorber having a plurality of cylindrical members entering one within the other, a packing ring upon the exterior of the inner said cylinder, and a packing ring upon the interior of said outer cylinder, means for closing the ends of said cylinders and a compression and suction means within the smaller of said cylinders and secured to the larger of said cylinders.

Signed at New York city, county and State of New York this 25 day of Oct., 1916.

SAMUEL GOFF CONKLING.

Witnesses:
G. E. S. MARR,
AUTHUR PHELPS MARR.